Dec. 29, 1953   H. B. LEWIS ET AL   2,664,477
INTERMITTENTLY OPERATING DIRECTION RESPONSIVE SWITCH
Filed March 27, 1950
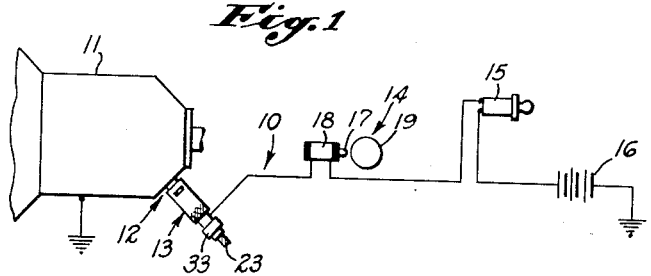
Fig. 1
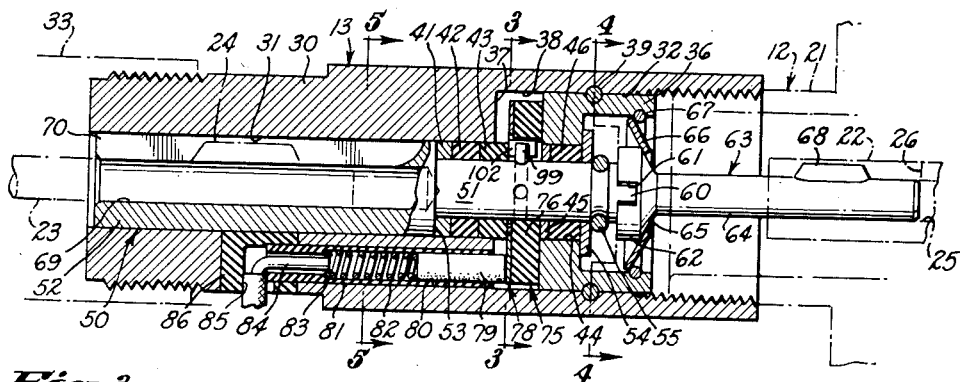
Fig. 2
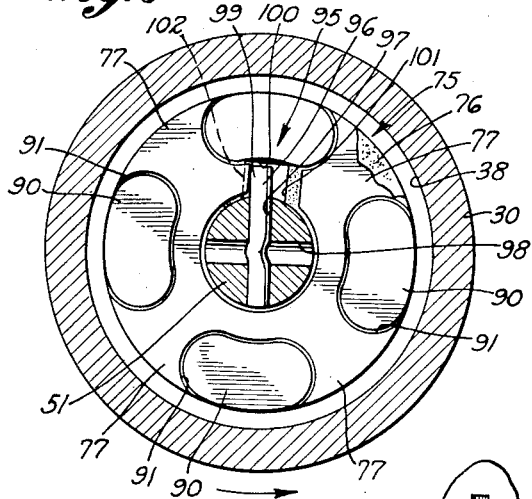
Fig. 3
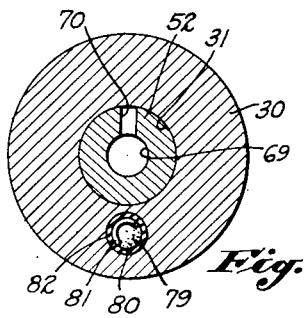
Fig. 4
Fig. 5
Fig. 6
INVENTORS:
HOWARD B. LEWIS
HOWARD FIELD JR.
BY THEIR ATTORNEYS
HARRIS, KIECH, FOSTER & HARRIS Patented Dec. 29, 1953

2,664,477

UNITED STATES PATENT OFFICE 2,664,477

INTERMITTENTLY OPERATING DIRECTION RESPONSIVE SWITCH

Howard B. Lewis and Howard Field, Jr., Los Angeles, Calif., assignors to B. F. McDonald Company, Los Angeles, Calif., a corporation of California Application March 27, 1950, Serial No. 152,044

17 Claims. (Cl. 200—61.39)

Our invention relates in general to electric switches and, more particularly, to an intermittently operating, direction responsive switch having particular utility in a circuit which includes a signal for providing a warning of impending danger from rearwardly moving vehicles.

Rearwardly moving automotive vehicles are responsible for considerable personal injury and property damage because of the restricted rearward field of vision available to the operators thereof, this being particularly true in the trucking field wherein the rearward field of vision available to the operator of a truck is frequently extremely limited or obstructed. Equipping automotive vehicles, and particularly trucks, with back-up warning systems has proven quite effective in reducing personal injury and property damage and, in recognition of this fact, various States have enacted legislation requiring installation of back-up warning systems in trucks.

Such a back-up warning system of necessity includes some means for closing the electrical circuit to the signal during rearward movement of the vehicle with which the system is associated, and for preventing closure of the electrical circuit during forward movement of the vehicle. Also, in order to provide some indication of the speed of the vehicle when moving rearwardly, it is desirable to operate the signal intermittently at a frequency proportional to the rearward speed of the vehicle. Accordingly, a primary object of the present invention is to provide a switch for such a back-up warning system which opens the electrical circuit to the warning signal when the vehicle is moving forwardly, and which cyclically closes the electrical circuit at a frequency proportional to the speed of the vehicle when the vehicle is moving rearwardly.

While the signal per se may be of any desired type, we prefer to employ an audible signal, rather than a visible one, and further prefer to employ an audible signal which operates only once for each closure of the electrical circuit, a single-stroke bell being an example of such an audible signal. With this arrangement, the signal is silent when the vehicle is stationary, even though the electrical circuit is closed, which is an important feature of the invention.

Another object of the invention is to provide an improved direction responsive, intermittently operating switch which is completely reliable, foolproof and of simple construction.

Still another object is to provide a switch of this character which may be interposed in the speedometer drives of conventional automotive vehicles without any necessity for modifying the structure of such vehicles. A related object is to provide a device which includes, in effect a universal joint means to avoid any necessity for accurately aligning the elements of the device with the elements of the speedometer drive.

An important object is to provide such a device which is adapted to energize a warning signal after only a slight rearward travel of the vehicle with which it is associated.

Another object of the invention is to provide a device of the foregoing nature which includes a direction responsive switch and an intermittently operating switch, the direction responsive switch having contacts which engage only during rearward travel of the vehicle, and the intermittently operating switch having contacts which engage and disengage cyclically at a frequency proportional to the speed of the vehicle during either forward or reverse movement thereof.

Another important object of the invention is to provide such a device wherein the means for cyclically engaging and disengaging the contacts of the intermittently operating switch includes the contacts of the direction responsive switch, preferably two in number.

More particularly, an important object of the invention is to provide a device wherein the intermittently operating switch includes a stationary contact and one or more movable contacts which are rotatable into and out of engagement with such stationary contact, and wherein one of the contacts of the direction responsive switch serves to transmit rotational movement to the rotational contacts of the intermittently operating switch.

Another object is to provide such a device wherein that contact of the direction responsive switch which transmits rotational movement to the rotatable contact of the intermittently operating switch engages the other contact of the direction responsive switch during rearward movement of the vehicle, and engages a stop which is electrically insulated from such other contact during forward movement of the vehicle.

Another object of the invention is to provide a self contained device of the foregoing nature which may be interposed in the speedometer drive of a vehicle readily, or which may readily be connected to any member rotatable in forward and reverse directions to close a circuit intermittently only during reverse rotation of such a member and at a frequency proportional to the rotational speed of such member.

The foregoing objects and advantages of our invention, together with various other objects and advantages thereof which will become evident, may be attained through the utilization of the exemplary embodiment of the invention which is illustrated in the accompanying drawing and which is described in detail hereinafter. Referring to the drawing:

Fig. 1 is a diagrammatic view of a back-up warning circuit in which the direction responsive, intermittently operating switch of the invention is installed;

Fig. 2 is a longitudinal sectional view of the direction responsive, intermittently operating switch of the invention;

Fig. 3 is an enlarged, transverse sectional view taken along the broken line 3—3 of Fig. 2;

Figs. 4 and 5 are transverse sectional views taken along the broken lines 4—4 and 5—5, respectively, of Fig. 2; and Fig. 6 is a fragmentary elevational view taken along the broken line 6—6 of Fig. 4 of the drawing.

Referring particularly to Fig. 1, the numeral 10 designates a back-up warning circuit installed in an automotive vehicle having a transmission 11 with a speedometer drive connection 12. The warning circuit 10 includes a direction responsive, intermittently operating switch 13 of the invention, the switch 13 being connectible to the speedometer drive connection 12 and being adapted to close the warning circuit intermittently during rearward movement of the vehicle only and at a frequency proportional to the speed of rearward movement of the vehicle. The switch 13 of the invention is connected in series with a warning signal 14, the latter being connected in series with a manually operated switch 15 which is preferably the ignition switch of the automotive vehicle and which is, in turn, connected to the battery 16 of the vehicle. The battery is grounded in the conventional manner. In order to complete the circuit, the switch 13 of the invention is electrically connected to the transmission 11 through the speedometer drive connection 12 in a manner to be discussed in detail hereinafter, the transmission also being grounded.

The signal 14 is preferably an audible signal of the type which operates only once for each closure of the switch 13, and is exemplified as a single-stroke bell having a clapper 17 operated by a solenoid 18 to strike a gong 19. As will be discussed hereinafter, the signal 14 thus provides a motion sensing element of the system.

Referring particularly to Fig. 2, the speedometer drive connection 12 may, as is conventional, comprise an externally threaded, tubular boss 21 secured to the housing of the transmission 11, as by being formed integrally therewith. The speedometer drive connection 12 also includes a rotatable element 22 which is driven by an element, not shown, of the transmission at a rotational speed proportional to the speed of the vehicle and in a direction corresponding to the direction of movement of the vehicle, i. e., either forwardly or rearwardly. A speedometer cable 23 is normally connected to the rotatable element 22 to operate the speedometer, not shown, of the vehicle, the particular speedometer cable illustrated being of the type having a round end with a single side tang 24. The rotatable element 22 of the speedometer drive connection 12 is provided with a complementary round opening 25 which receives the round end of the speedometer cable 23, and is provided with a communicating slot 26, or the like, which receives the side tang 24. It will be understood, of course, that the invention is not limited to the particular single side tang construction illustrated, but may be employed in connection with a speedometer cable having a double side tang, or with one having a square end.

Considering the switch 13 of the invention in more detail, it includes a housing 30 having a bore 31 therethrough and having a counterbore 32 at one end of the bore 31. The counterbore 32 is internally threaded for connection to the externally threaded, tubular boss 21 of the speedometer drive connection 12, as shown in Fig. 2. The opposite end of the housing 30 is externally threaded and of the same external diameter as that of the externally threaded boss 21 so as to receive a coupling 33 at the end of the flexible sleeve enclosing the speedometer drive connection 12 readily by disconnecting the coupling 33 from the boss 21 and by connecting the housing to the boss 21 and the coupling 33 to the housing.

Disposed in the counterbore 32 is a cup-shaped bearing 36 which is spaced from the shoulder 37 at the junction of the counterbore with the bore 31 to provide a chamber 38. The bearing 36 is secured in the counterbore 32 by a lock ring 39 which is installable through a slot 40 in the housing 30, as best shown in Figs. 4 and 6.

Disposed in the bore 31 adjacent one end of the chamber 38 are a metal annulus 41, an annulus 42 of packing material and an annulus 43 of electrical insulating material, and disposed in an aligned bore 44 through the bearing 36 adjacent the other end of the chamber 38 is a metal annulus 45 and an annulus 46 of packing material. Disposed in the housing 30 is a shaft 50 having a stem 51 which is journaled in the annuli 41, 42, 43, 45 and 46, and having an elongated head 52 journaled in the bore 31 through the housing. Axial movement of the shaft 50 toward the right, as viewed in Fig. 2, is prevented by engagement of a shoulder 53 at the junction of the stem 51 and head 52 with the metal annulus 41. Conversely, axial movement of the shaft 50 toward the left, as viewed in Fig. 2, is prevented by engagement of a washer 54 with the annulus 46 and with the inner transverse wall of the cup-shaped bearing 36, the washer 54 being carried by the stem 51 of the shaft and being retained thereon by a snap ring 55.

The stem 51 of the shaft 50 is provided at its free end with a transverse tongue 60 which is disposed in a transverse groove 61 in the head 62 of a shaft 63 having a stem 64, the head 62 being provided with a beveled annular face 65 at its junction with the stem 64. The shaft 63 is retained in engagement with the shaft 50 by a concave annular retainer 56 which bears against the beveled annular face 65 and which is secured relative to the bearing 36 by a snap ring 67.

In the particular construction illustrated, the stem 64 of the shaft 63 is round and is provided with a single side tang 68, the stem 64 and side tang 68 being insertable into the opening 25 and slot 26, respectively, in the rotatable element 22 of the speedometer drive connection 12. The head 52 of the shaft 50 is provided with an opening 69 and slot 70 therein to receive the round end and side tang 24, respectively, of the speedometer cable 23. Although the stem 64 is shown as round and provided with the side tang 68, and although the head 52 is shown as provided with the round opening 69 and the slot 70, it will be understood that the configurations of these parts may be modified to fit particular speedometer drive connections, such as the double side tang type, or the square type.

As will be apparent, the shafts 50 and 63 of the switch 13 of the invention may be interposed between the rotatable element 22 of the speedometer drive connection 12 and the speedometer cable 23 readily by inserting the stem 64 of the shaft 63 into the rotatable element 22 and by inserting the end of the speedometer cable 23 into the head 52 of the shaft 50 as the housing and the coupling 33 are connected to the tubular boss 21 and the housing 30, respectively. Thus, the rotatable element 22 drives the speedometer cable 23 through the shafts 63 and 50 when the switch 13 of the invention is installed. A feature of the invention resides in providing a groove 61 for the tongue 60 with a slightly greater width than that of the tongue so as to provide, in effect, a self aligning connection between the shafts 50 and 63. Such self aligning connection compensates for minor inaccuracies in the axial and angular alignment of the various parts and thus does not require close tolerances in the manufacture of the switch 13.

A discussion of the switch 13 of the invention has thus far been concerned with the housing 30 and the shafts 50 and 63, and the switch elements incorporated in the switch 13 will now be considered in detail. As best shown in Fig. 2, rotatably mounted on the shaft 50 within the chamber 38 is a commutator 75 which is disposed between and frictionally engages the annuli 43 and 45 and which frictionally engages the outer transverse wall of the cup-shaped bearing 36. The commutator 75 comprises a disc 76 of insulating material one side of which engages the bearing 36 and the annulus 45 and the other side of which is faced with metal, or other conducting material. As best shown in Fig. 3, the metal facing on the disc 76 is provided with four radially extending arms in the particular construction illustrated, such arms serving as contacts 77 of an intermittently operating switch 78. As the commutator 75 is rotated in either a forward direction or reverse direction, as will be discussed in more detail hereinafter, the contacts 77 carried thereby rotate into and out of engagement with a stationary contact 79 seriatim at a frequency proportional to the rotational speed of the commutator. The contact 79 is preferably a brush which is movable axially in a bore 80 in the housing 30 and which is biased toward the commutator by a compression spring 81 so as to engage the contacts 77 positively. In order to insulate the brush 79 and the spring 81 electrically from the housing 30, they are disposed in a liner 82 of insulating material which is disposed in the bore 80, the spring 81 also being seated against a shoulder 83 of the liner. The spring 81 serves to conduct electricity between the brush 79 and a conductor 84, such as a wire, which is connected to one end of the spring and which extends through an opening 85 in an insert 86 of insulating material to the exterior of the housing 30. The wire 84 may be connected to the signal 14, as illustrated in Fig. 1 of the drawing.

In order to provide the commutator 75 with a smooth facing for the brush 79, the spaces between the electrically interconnected contacts 77 are occupied by elements 90 of wear resistant material, the exposed surfaces of the elements 90 being flush with the exposed surfaces of the contacts 77. In the particular construction illustrated, the elements 90 are formed of the same material as the contacts 77 and are insulated therefrom by attaching them to the insulating disc 76 with an insulating cement, or other suitable material, such cement also being disposed in clearances 91 between the elements 90 and the contacts 77. It will be understood, however, that the elements 90 may be formed of an electrical insulating material. Also, various other changes may be made in the particular structure shown for the commutator 75.

The switch 13 of the invention is provided with means including a direction responsive switch 95 for transmitting rotational movement of the shaft 50 in forward and reverse directions to the commutator 75 to move successive ones of the contacts 77 into and out of engagement with the brush 79. More particularly, the direction responsive switch 95 includes a pin 96 which is disposed in a bore 97 through the shaft 50 and which is retained therein by crimping it intermediate its ends by means of a punch, not shown, or other suitable tool inserted through a cross bore 98. The pin 96 is provided with a projecting end which serves as a contact 99 of the direction responsive switch 95. The contact 99 extends into a notch 100 in the insulating disc 76, one side of this notch serving as a stop 101 which is engageable by the contact 99 during forward rotation of the shaft 50 to rotate the commutator 75 in the forward direction, forward rotation of the shaft 50 corresponding to forward movement of the vehicle. A portion of the metallic or other conductive facing which forms and electrically interconnects the contact 77 extends into and faces the other side of the notch 100. Such portion of the conductive facing provides a contact 102 which is electrically connected to the contacts 77 so as to connect the intermittently operating switch 78 and the direction responsive switch 95 in series, and which is engageable by the contact 99 during reverse rotation of the shaft 50 to close the direction responsive switch and to rotate the commutator 75 in the reverse direction.

Considering the operation of the switch 13, when the vehicle on which it is installed is moving forwardly, the rotatable element 22 of the speedometer drive connection 12 rotates the shaft 50, through the shaft 63, in the forward direction. Consequently, the contact 99 carried by the shaft 50 engages the stop 101 provided by the insulating disc 76 to transmit rotation of the shaft 50 to the commutator 75 and thus move the contacts 77 into and out of engagement with the brush 79 seriatim. However, no current flows through the warning circuit 10 under such conditions because of the fact that the direction responsive switch 95 is open so long as the contact 99 is out of engagement with the contact 102. Thus, the warning signal 14 is not energized during forward movement of the vehicle.

Conversely, during rearward movement of the vehicle, the rotatable element 22 of the speedometer drive connection 12 rotates the shaft 63 in the reverse direction to rotate the shaft 50 in such direction. Consequently, the contact 99 carried by the shaft 50 engages the contact 102 carried by the commutator 75 to close the direction responsive switch 95 and to transmit rotation of the shaft 50 to the commutator so as to move the contacts 77 into and out of engagement with the brush 79 seriatim, thereby opening and closing the intermittently operating switch 78 at a frequency proportional to the rearward speed of the vehicle. The signal 14 is energized at the same frequency, thereby giving persons in the path of the vehicle an indication of the speed at which it is approaching them.

In the event that the vehicle stops with the contact 99 in engagement with the contact 102 and with the brush 79 in engagement with one of the contacts 77, the solenoid 18 of the signal 14 is energized by a continuous current as long as the ignition switch 15 is closed. However, such a continuous current does not operate the signal 14 since, as hereinbefore explained, it operates only on an intermittent current. Thus, the signal 14 is motion-sensitive and acts as a silencing element under such conditions, which is an important feature.

It will be noted that the contacts 77 and 102 carried by the commutator 75 are insulated electrically by the insulating disc 76 on which they are mounted and by the insulating annulus 43 which bears against the conductive facing forming such contacts. Thus, the contacts 77 can electrically engage the brush 79 only, the latter being electrically insulated by the liner 82 as hereinbefore discussed. The contact 99 is an electrical contact with the shaft 50 so that it is grounded to the housing of the transmission 11 either directly through the switch housing 30, or through the shaft 63 and the rotatable element 22 of the speedometer drive connection 12.

Referring particularly to Fig. 3, a feature of the invention resides in making the circumferential extent of contact 99, i. e., the diameter of the pin 96 forming this contact, only slightly less than the spacing between the stop 101 and the contact 102 so as to minimize lost motion between the shaft and the commutator 75 upon changes in the direction of rotation of the shaft 50. This insures that the contact 99 will engage the contact 102 to energize the warning circuit 10 after only a very slight rearward movement of the vehicle, thereby energizing the warning signal 14 almost immediately upon commencement of rearward movement.

As will be apparent, relative movement between the shaft 50 and the commutator 75 to produce movement of the contact 99 between the stop 101 and the contact 102 results from friction between the commutator and the annuli 43 and 45, the bearing 36 and the brush 79.

It will be noted that the invention provides a positively acting switch which is of simple construction, the concept of employing the direction responsive switch 95 as a means for driving the commutator 75 adding materially to the simplicity of construction.

Although we have disclosed an exemplary embodiment of our invention herein for purposes of illustration, it will be understood that various changes, modifications and substitutions may be incorporated in such embodiment without departing from the spirit of the invention.

We claim as our invention:

1. In an intermittently operating, direction responsive switch, the combination of: an intermittently operating switch including a stationary contact and including another contact rotatable relative to said stationary contact in forward and reverse directions, said rotatable contact engaging and disengaging said stationary contact periodically during rotation of said rotatable contact in said forward and reverse directions at a frequency proportional to the rotational speed of said rotatable contact; actuating means for rotating said rotatable contact relative to said stationary contact in said forward and reverse directions, including a direction responsive switch having one contact electrically and structurally connected to said rotatable contact of said intermittently operating switch and having another contact rotatable relative to said one contact of said direction responsive switch in said forward and reverse directions, said one contact of said direction responsive switch being disposed in the path of reverse rotation of said other contact thereof so that said other contact of said direction responsive switch engages said one contact thereof during rotation of said other contact of said direction responsive switch in said reverse direction; and a stop structurally connected to and electrically insulated from said one contact of said direction responsive switch, said stop being spaced from said one contact of said direction responsive switch and being disposed in the path of forward rotation of said other contact of said direction responsive switch so that said other contact thereof disengages said one contact thereof and engages said stop during rotation of said other contact thereof in said forward direction.

2. An intermittently operating, direction responsive switch, including: primary and secondary members rotatable in forward and reverse directions; means including a direction responsive switch for transmitting rotational movement of said primary member in said forward and reverse directions to said secondary member, said direction responsive switch being closed during rotation of said primary and secondary members in said reverse direction and being open during rotation thereof in said forward direction; and an intermittently operating switch actuable by said secondary member during rotation thereof in said forward and reverse directions at a frequency proportional to the rotational speed of said secondary member, said intermittently operating switch being operatively connected to said secondary member and being connected in series with said direction responsive switch.

3. An intermittently operating, direction responsive switch, including: primary and secondary members rotatable in forward and reverse directions; means including a direction responsive switch for transmitting rotational movement of said primary member in said forward and reverse directions to said secondary member, said direction responsive switch including a first contact carried by said primary member and including a second contact carried by said secondary member and disposed in the rotational path along which said first contact moves during rotation of said primary member in said reverse direction; and an intermittently operating switch including a third contact carried by said secondary member and a fourth, stationary contact disposed in the rotational path along which said third contact moves during rotation of said secondary member in said forward and reverse directions, said third contact being electrically connected to said second contact.

4. In a direction responsive, intermittently operating switch, the combination of: primary and secondary members rotatable in forward and reverse directions, said secondary member providing a stop; first and second contacts respectively carried by said primary and secondary members, said second contact being circumferentially spaced from said stop and said first contact being insertable between said second contact and said stop, said first contact engaging said stop during forward rotation of said primary rotatable member to transmit such rotation to said secondary rotatable member, and engaging said second contact during reverse rotation of said primary rotatable member to transmit such rotation to said secondary rotatable member and to close said direction responsive switch; a third contact carried by said secondary rotatable member and electrically connected to said second contact thereof, said third contact being movable along a circular path during rotation of said secondary rotatable member in said forward and reverse directions, the circumferential extent of said third contact being less than the length of said circular path; and a fourth contact disposed in said circular path to be engaged by said third contact during rotation of secondary rotatable member in said forward and reverse directions at a frequency proportional to the rotational speed of said secondary rotatable member.

5. A direction responsive switch according to claim 4 wherein said circumferential spacing between said stop and said second contact is only slightly greater than the circumferential extent of said first contact to minimize lost motion between said primary and secondary members.

6. In a direction responsive, intermittently operating switch, the combination of: a housing, a rotatable shaft in said housing; a member disposed in said housing and rotatable relative to said shaft about the axis of rotation of said shaft, said member providing a stop; first and second contacts respectively carried by said shaft and said member, said second contact being circumferentially spaced from said stop and said first contact being disposed between said second contact and said stop, said first contact engaging said stop during rotation of said shaft in a forward direction to transmit such rotation to said member, and engaging said second contact during rotation of said shaft in a reverse direction to transmit such rotation to said member; and third and fourth contacts respectively carried by said member and said housing, said third contact being carried by said member and being electrically connected to said second contact and being movable along a circular path during rotation of said member in said forward and reverse directions, said fourth contact being disposed in said circular path to be engaged by said third contact.

7. An intermittently operating, direction responsive switch as defined in claim 12 wherein the circumferential extent of said third contact is less than the length of said circular path, said fourth contact being engageable by said third contact, during rotation of said member in said forward and reverse directions at a frequency proportional to the rotational speed of said member.

8. A direction responsive, intermittently operating switch according to claim 7 wherein said member comprises a disc rotatably mounted on said shaft and wherein said third contact is mounted on one face of said disc, said fourth contact comprising a spring pressed brush engaging said one face of said disc.

9. In a back-up warning switch adapted to be interposed in a speedometer drive of a vehicle, the vehicle providing a speedometer drive connection having a rotary element which is rotatable in forward and reverse directions in response to forward and reverse movement of the vehicle and which is normally connected to a speedometer cable, said switch being adapted to energize a back-up warning circuit only during reverse movement of the vehicle, and including in combination: a housing; means for connecting said housing to the speedometer drive connection of the vehicle; a shaft rotatable in said housing; means for connecting one end of said shaft to the rotary element of the speedometer drive connection so that said shaft rotates in a forward direction during forward movement of the vehicle and rotates in a reverse direction during reverse movement of the vehicle; means for connecting the opposite end of said shaft to the speedometer cable; a member disposed in said housing and rotatable in said forward and reverse directions about the axis of rotation of said shaft, said member providing a stop; first and second contacts respectively carried by said shaft and said rotatable member, said second contact being circumferentially spaced from said stop and said first contact being disposed between said second contact and said stop, said first contact engaging said stop during forward rotation of said shaft to transmit such rotation to said rotatable member, and engaging said second contact during reverse rotation of said shaft to transmit such rotation to said rotatable member; and third and fourth contacts respectively carried by said rotatable member and said housing, said third contact being electrically connected to said second contact and being movable along a circular path during rotation of said rotatable member in said forward and reverse directions, the circumferential extent of said third contact being less than the length of said circular path, and said fourth contact being disposed in said circular path to be engaged by said third contact during forward and reverse rotation of said rotatable member at a frequency proportional to the rotational speed of said rotatable member.

10. In a back-up warning switch adapted to be interposed in a speedometer drive of a vehicle, the vehicle providing a speedometer drive connection having a rotary element which is rotatable in forward and reverse directions in response to forward and reverse movement of the vehicle and which is normally connected to a speedometer cable, said switch being adapted to energize a back-up warning circuit only during reverse movement of the vehicle, and including in combination: a housing; means for connecting said housing to the speedometer drive connection of the vehicle; a rotatable shaft in said housing; means, including tongue and groove means, for connecting one end of said shaft to the rotary element of the speedometer drive connection; means for connecting the other end of said shaft to the speedometer cable; a direction responsive switch operatively connected to and actuable by said shaft and adapted to be closed thereby only when said shaft is rotated in a reverse direction by the rotary element of the speedometer drive connection; and an intermittently operating switch operatively connected to and actuable by said shaft during rotation thereof in forward and reverse directions and connected in series with said direction responsive switch.

11. In a device of the character described, the combination of: a rotatable shaft; an intermittently operating switch including a stationary contact and a rotatable contact movable into and out of engagement with said stationary contact; and lost-motion connecting means between said shaft and said rotatable contact for transmitting rotation of said shaft to said rotatable contact, said lost-motion connecting means including a pair of contacts one of which is carried by said shaft and is movable into engagement with the other during rotation of said shaft in one direction, said other contact being electrically and structurally connected to said rotatable contact.

12. In a device of the character described, the combination of: an intermittently operating switch comprising a brush contact and a commutator carrying at least one contact movable into and out of engagement with said brush contact upon rotation of said commutator; a direction responsive switch including a pair of contacts one of which is carried by said commutator and is electrically connected to the movable contact of said intermittently operating switch; and means for engaging said contacts of said direction responsive switch during rotation of said commutator in one direction only.

13. In an intermittently operating, direction responsive switch adapted to be connected in series with an electrical signal operating only on intermittent current, the combination of: an intermittently operating switch including a pair of contacts one of which is movable into and out of engagement with the other; and actuating means movable in forward and reverse directions for cyclically moving said one contact into and out of engagement with said other contact, said actuating means including driving and driven elements, and including a direction responsive switch which is connected in series with said intermittently operating switch and which provides a driving connection between said driving and driven elements, said direction responsive switch opening in response to movement of said actuating means in said forward direction and closing in response to movement of said movable means in said reverse direction.

14. In an intermittently operating, direction responsive switch, the combination of: a tubular housing provided with an axial chamber therein and provided with an auxiliary bore therein substantially parallel to the axis of said tubular housing and spaced radially from said axial chamber; shaft means rotatably disposed in said axial chamber; a commutator disposed in said axial chamber and loosely mounted on said shaft means, said commutator providing a stop; a direction responsive switch including a first contact carried by said shaft means and a second contact carried by said commutator, said second contact being circumferentially spaced from said stop and said first contact being disposed between said stop and said second contact, whereby said first contact engages said stop to rotate said commutator during forward rotation of said shaft means, and engages said second contact to close said direction responsive switch and to rotate said commutator during reverse rotation of said shaft means; a third contact carried by said commutator and facing one end of said auxiliary bore, said third contact being electrically connected to said second contact and having a circumferential extent of less than 360° so that said third contact periodically rotates into alignment with said auxiliary bore during rotation of said commutator; a fourth, brush contact slidable in said auxiliary bore and engageable with said third contact periodically to provide an intermittently operating switch; and resilient means in said auxiliary bore for biasing said brush contact into engagement with said third contact.

15. A switch as defined in claim 14 wherein said axial chamber is internally threaded at one end for connection to a speedometer drive connection of an automobile, and wherein the corresponding end of said shaft means provides means engageable with a rotary element of the speedometer drive connection, the other end of said tubular housing being externally threaded for connection to a speedometer cable and the other end of said shaft means providing means for connection to a rotary element of the speedometer cable, whereby said shaft means transmits rotational movement of the rotary element of the speedometer drive connection to the rotary element of the speedometer cable.

16. A switch as defined in claim 14 wherein said axial chamber is defined by a main bore extending axially through said housing, and by a counterbore at one end of said housing, said auxiliary bore extending to a shoulder provided at the junction of said counterbore and said main bore, and said commutator being disposed between said shoulder and a plug member disposed in said counterbore, said plug member having a bore therethrough aligned with said main bore and said shaft means being rotatably disposed in said main bore and said bore through said plug member.

17. A switch according to claim 14 wherein said shaft means includes shaft elements in axial alignment, and includes a flexible connection between said shaft elements.

HOWARD B. LEWIS.
HOWARD FIELD, Jr.

References Cited in the file of this patent

UNITED STATES PATENTS

| Number | Name | Date |
|---|---|---|
| 1,566,888 | Luckeman | Dec. 22, 1925 |
| 2,038,323 | Thomas | Apr. 21, 1936 |
| 2,116,842 | Metcalf | May 10, 1938 |
| 2,145,634 | Rook et al. | Jan. 31, 1939 |
| 2,186,765 | Metcalf | Jan. 9, 1940 |
| 2,427,453 | Hadley | Sept. 16, 1947 |